(12) United States Patent
Donnelly et al.

(10) Patent No.: US 11,172,055 B2
(45) Date of Patent: Nov. 9, 2021

(54) NETWORK RECORDERS WITH ENTROPY AND VALUE BASED PACKET TRUNCATION

(71) Applicant: Endace Technology Limited, Auckland (NZ)

(72) Inventors: Stephen Frank Donnelly, Auckland (NZ); Jeremy Stringer, Auckland (NZ); Stuart Wilson, Auckland (NZ)

(73) Assignee: Endace Technology Limited, Hamilton (NZ)

( * ) Notice: Subject to any disclaimer, the term of this patent is extended or adjusted under 35 U.S.C. 154(b) by 0 days.

(21) Appl. No.: 16/163,545

(22) Filed: Oct. 17, 2018

(65) Prior Publication Data

US 2019/0158635 A1    May 23, 2019

Related U.S. Application Data

(60) Provisional application No. 62/573,800, filed on Oct. 18, 2017.

(51) Int. Cl.
| | |
|---|---|
| *H04L 29/06* | (2006.01) |
| *H04L 1/00* | (2006.01) |
| *H04L 12/26* | (2006.01) |
| *H04L 12/805* | (2013.01) |
| *H04L 12/24* | (2006.01) |
| *H03M 7/30* | (2006.01) |

(52) U.S. Cl.
CPC .............. *H04L 69/22* (2013.01); *H03M 7/30* (2013.01); *H04L 1/0007* (2013.01); *H04L 41/142* (2013.01); *H04L 43/02* (2013.01); *H04L 43/08* (2013.01); *H04L 43/12* (2013.01); *H04L 47/365* (2013.01); *H04L 63/0428* (2013.01); *H04L 69/04* (2013.01)

(58) Field of Classification Search
CPC combination set(s) only.
See application file for complete search history.

(56) References Cited

U.S. PATENT DOCUMENTS

| | | | |
|---|---|---|---|
| 6,757,437 B1 * | 6/2004 | Keith | G06F 17/148 |
| | | | 375/E7.016 |
| 8,358,623 B2 * | 1/2013 | Samar | H04W 36/0011 |
| | | | 370/331 |
| 9,398,489 B1 * | 7/2016 | Akhter | H04L 69/04 |
| 9,706,550 B1 * | 7/2017 | Zhou | H04W 72/0446 |
| 9,756,061 B1 | 9/2017 | Roeh et al. | |

(Continued)

OTHER PUBLICATIONS

Young, Lee W.; PCT/US18/56391; International Search Report and Written Opinion; dated Apr. 29, 2019; 7 pages.

(Continued)

*Primary Examiner* — Yee F Lam
(74) *Attorney, Agent, or Firm* — Alford Law Group, Inc.; Tobi C. Clinton

(57) ABSTRACT

In one embodiment, a computer-implemented method of conserving storage space in a network recorder includes receiving a computer packet including a header and payload data; estimating entropy of the payload data in the computer packet; determining if storage of the computer packet is of value or not based on the header of the computer packet; and storing all or a portion of the computer packet into a storage device based on the estimated entropy and the value determination.

22 Claims, 9 Drawing Sheets

(56) References Cited

U.S. PATENT DOCUMENTS

| | | | |
|---|---|---|---|
| 2002/0129140 A1* | 9/2002 | Peled | H04L 63/0245 709/224 |
| 2003/0193962 A1* | 10/2003 | Primrose | H04L 49/9094 370/411 |
| 2004/0010473 A1 | 1/2004 | Hsu et al. | |
| 2004/0146209 A1* | 7/2004 | Kadowaki | H04N 19/172 382/233 |
| 2004/0165780 A1* | 8/2004 | Maki | H04N 19/42 382/232 |
| 2004/0213466 A1* | 10/2004 | Kodama | H04N 19/164 382/232 |
| 2005/0111740 A1* | 5/2005 | Sakuyama | H04N 19/16 382/232 |
| 2006/0177138 A1* | 8/2006 | Kadowaki | H04N 19/63 382/232 |
| 2006/0222254 A1* | 10/2006 | Zandi | H04N 19/15 382/240 |
| 2006/0228028 A1* | 10/2006 | Kadowaki | H04N 19/61 382/232 |
| 2006/0291464 A1* | 12/2006 | Primrose | H04L 49/30 370/389 |
| 2007/0097960 A1 | 4/2007 | Narashima | |
| 2009/0232408 A1* | 9/2009 | Meany | H03M 7/40 382/246 |
| 2009/0281984 A1* | 11/2009 | Black | H04L 43/026 |
| 2010/0195538 A1 | 8/2010 | Merkey et al. | |
| 2010/0287383 A1 | 11/2010 | Conte et al. | |
| 2012/0011351 A1* | 1/2012 | Mundra | H04W 12/0609 713/1 |
| 2014/0244604 A1 | 8/2014 | Oltean et al. | |
| 2015/0052601 A1* | 2/2015 | White | H04L 63/1416 726/13 |
| 2015/0066713 A1 | 3/2015 | Burgain et al. | |
| 2016/0191918 A1 | 6/2016 | Lai et al. | |
| 2016/0241574 A1 | 8/2016 | Kumar et al. | |
| 2016/0330479 A1* | 11/2016 | Liu | H04N 19/13 |
| 2016/0345030 A1* | 11/2016 | Karczewicz | H04N 19/124 |
| 2018/0084284 A1* | 3/2018 | Rosewarne | H04N 19/91 |

OTHER PUBLICATIONS

Shannon, C.E.; "A Mathematical Theory of Communication"; The Bell System Technical Journal; vol. 27; Jul. 1948; pp. 379-423, 625-656; (55 pages).

Poggio, Francesa; European Patent Office Search Report; App. No. EP18868626; dated Jun. 15, 2021; 7 pgs.

Rennick, David; App. No. GB1816801.3; UK IP Office Search Report; dated Mar. 1, 2019; 4 pages.

* cited by examiner

FIG. 4C

| Offsets | Octet | | | | | | 0 | | | | | | | | 1 | | | | | | | | 2 | | | | | | | | 3 | | | |
|---|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||| Destination port |||||||||||||||||
| 4 | 32 | Sequence number |||||||||||||||||||||||||||||||||
| 8 | 64 | Acknowledgement number (if ACK set) |||||||||||||||||||||||||||||||||
| 12 | 96 | Data Offset |||| Reserved 0 0 0 ||| N S | C W R | E C E | U R G | A C K | P S H | R S T | S Y N | F I N | Window Size ||||||||||||||||
| 16 | 128 | Checksum ||||||||||||||| Urgent pointer (if URG set) |||||||||||||||||
| 20 | 160 | Options (if data offset>5. Padded at the end with "0" bytes if necessary.) |||||||||||||||||||||||||||||||||
| ... | | ... |||||||||||||||||||||||||||||||||

400T, 401A

FIG. 4D (Same table structure as FIG. 4C, with 400T', 401A, 402T)

NETWORK RECORDERS WITH ENTROPY AND VALUE BASED PACKET TRUNCATION

CROSS REFERENCE

This patent application claims the benefit of U.S. provisional patent application No. 62/573,800, titled ENTROPY AND VALUE BASED PACKET TRUNCATION, filed on Oct. 18, 2017, by inventors Stephen Donnelly et al.

FIELD

The embodiments of the invention relate generally to computer network data packet capture and storage in a storage device.

BACKGROUND

Computer network data packets are captured and stored in a storage device to record the history of a defined computer network (e.g., local area network or wide area network) such as can be found in a data center. The data packets are captured and temporarily stored in a storage device, such as a network probe or network recorder, to capture a window of history. The capacity of the storage device is often finite of a predetermined size such that the window of history is limited to an approximate period of time (retention time) such as an approximate number of days or weeks, depending upon bandwidth into the computer network.

The recorded network data packets in the network probe device are often used for incident investigation and performance evaluations. Incident investigations occur when a computer data base, a network server, or the network itself abused by a computer hacker, for example. The incident investigation often depends on the recorded packets in the network probe to provide ground truth evidence into the abuse or hacking. In other cases, the recorded network data packets in the network probe device can be used for network and/or equipment performance evaluations to determine poor performance or failure mechanisms.

Full and complete capture of network (IP) packets into and out of a network can use a lot of available storage space in a network probe storage device. The amount of data to be stored is an integration of the bandwidth over time. The storage space in a network probe is typically a predetermined finite value. Each unit of storage space has an economic costs and limits the maximum economic retention time. To be economically efficient with the finite storage space, one can retain more information for less time history or retain less information for more time history.

It is desirable to increase the retention time in network probes with a predetermined storage space.

BRIEF SUMMARY

The embodiments of the invention are best summarized by the claims that follow below. However briefly, in order to decrease storage space usage and increase data retention time of computer data network packets, frames of data can be categorized by estimating the entropy of the packet payload. The value of frame content can be determined based on the entropy and other information in the media layers, layer one (physical layer), layer two (data link layer), and layer three (network layer), of the open systems interconnection (OSI) model of a computer network data packet. Prior to storage, the data payload in low value frames and packets can be completely or partially truncated during packet capture to save storage space usage and increase retention time. Encrypted payloads and compressed payloads often have very high entropy because of their randomness. Without encryption/decryption keys, encrypted payloads cannot be decrypted so often they have low storage value. Compressed payloads are often made up of compressed commodity data (e.g., movies, television, music) that can be recreated and so they also can have a low storage value (utility). Moreover, compressed payloads may not be further compressible. Accordingly, payload data with high entropy (high entropy payload data) can often be subject to payload truncation to conserve storage space and increase retention time. On the other hand, plain text data is readily viewable and often has low entropy. Because the payload data is readily viewable it can have a high storage value. Accordingly, it is desirable to save the payload data and avoid truncation. However, instead of truncation, the low entropy frames of data can be compressed to further conserve storage space and increase retention time in a network probe storage device.

BRIEF DESCRIPTIONS OF THE DRAWINGS

FIGS. 4C-4D illustrate diagrams of exemplary truncated network packets.

DETAILED DESCRIPTION

Figure 1:
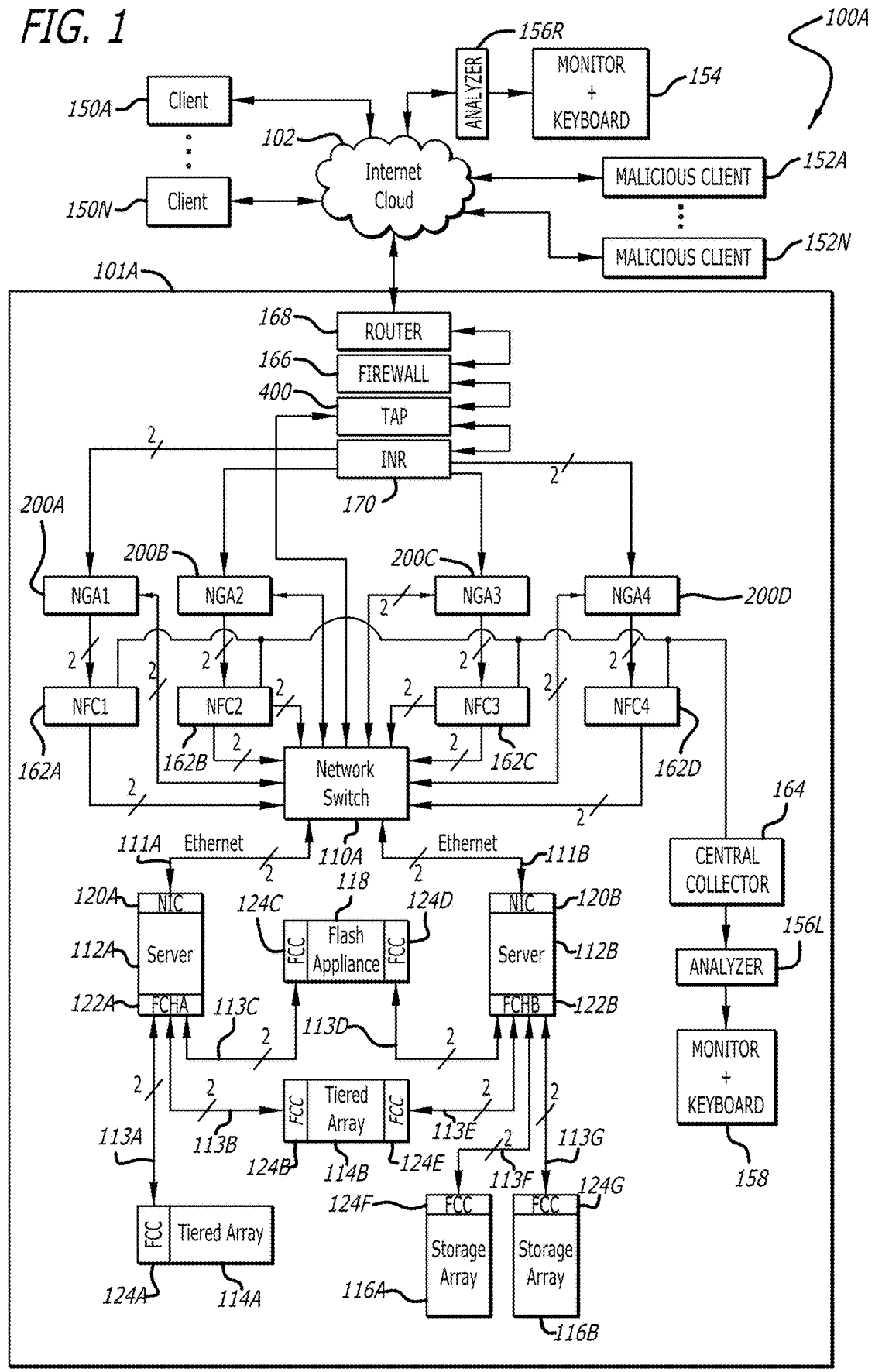
FIG. 1 illustrates a functional block diagram of a data center configured for centralized packet capture of computer network packets and centralized netflow record collection.

In the following detailed description of the embodiments of the invention, numerous specific details are set forth in order to provide a thorough understanding of the present invention. However, it will be obvious to one skilled in the art that the embodiments of the invention can be practiced without these specific details. In other instances well known methods, procedures, components, and circuits have not been described in detail so as not to unnecessarily obscure aspects of the embodiments of the invention.

If a subset of a computer data network packet or its contents can be stored instead of the full packet, then the retention time of computer data network packets can be increased for the same amount of data storage space in a network probe or network recorder. On the other hand, storing a subset of the computer data network packets can reduce the amount of data coverage and thus lower the value of the stored subsets of packets for an incident investigation or performance evaluation. Taking into account the value (utility) of storage of the payload data of the packets in the determination of whether to truncate or not, retention time can be increased with little to no loss in value and data coverage.

The embodiments of the invention includes a method, apparatus and system of entropy and value based packet truncation for intelligent network recorders.

Computer network (internet protocol) data packets (e.g., TCP, UDP, Ethernet packets) can have an entropy value associated with it. According to C. E. Shannon's *A mathematical theory of communication* published in the Bell System Technical Journal 27 (1948) page, 379-423, 625-656, incorporated herein by reference; entropy is a measure of uncertainty of a message. Entropy can be used to measure the information content of a message, such as by analyzing the payload data in a packet. Entropy can represent the uniformity (or on the opposite end of the scale randomness) of a message. A measure of entropy H can be determined with the following equation:

$$H = -K \sum_{i=1}^{m} p_i \log(p_i),$$

where there is a fixed number m of possible events A1 through Am whose probabilities of occurrence p1 through pm are known. A measure of entropy can be reported in a range between zero to eight using a byte of eight bits of data.

At the lowest end of the scale, a measure of zero entropy indicates that entropy was not calculated for some reason, such as a packet without payload data, or a lowest step 1/32 (0.03125) level of entropy. The rest of the range can be reported in steps of 1/32 (0.03125) from 0.0625 (2/32) to 8.0 ($2^{56}$/8) using the byte of data. Encoded in hex, the binary bits can begin with 0x00 (Not calculated); 0x01 (2/32=0.0625); 0x02 (3/32=0.09375); continuing on incrementally by adding 0x01 (1/32=0.0625) to previous value so that near the upper end of the range, 0xFD ($254$/32=7.9375); 0xFE ($255$/32=7.96875); and finally to 0xFF ($256$/32=8.0).

For example, consider a data payload of plain text. For plain text messages the payload is encoded in ASCII or ANSI where values from 32 to 127 are used for printable characters. In a payload of data containing only a single repeated byte value (e.g., 0) entropy is minimized, approaching 0.0. In written text documents, multiple character values are used which increases entropy, however the probability of the occurrence of each character (letter) is not equal which decreases entropy. Furthermore not all potential values of characters are utilized, such that a maximum entropy value (e.g., 8.0) cannot be reached in text documents. Accordingly, text documents typically have a moderate entropy value. If an appropriate entropy truncation threshold for packets with text is selected, the payload data can be saved instead of truncated.

As another example, consider a data payload of encrypted data as was considered in Entropy Estimation for Real-Time Encrypted Traffic Identification by Peter Dorfinger et al published April 2011 in TMA 2011 Proceedings of the Third international conference on Traffic Monitoring and Analysis, pages 164-171, incorporated herein by reference. An encrypted frame of data in a payload packet is a more uniform data stream with equal probabilities for each event/symbol. Equal probabilities lead to a maximum value for the entropy. That is, equal probabilities of occurrence p1-pm for events when summed together results in a higher value of entropy H. Thus, an encrypted frame of data in a payload packet will result in a computed measure of entropy closer to the maximum value of eight. A data payload of compressed data is similar to encrypted data and usually also has a high entropy. These type of computer data packets with high entropy payloads can be considered to have a high entropy. Accordingly, if an appropriate entropy truncation threshold for packets with encrypted data is selected, the payload data can be truncated.

An entropy truncation threshold value, between a maximum (e.g., seven) entropy value and a minimum (e.g., zero) entropy value, can be used for comparison with the computed entropy value. The comparison of the entropy truncation threshold value with the computed entropy value is used to distinguish between data packets having high entropy payloads and data packets having low entropy payloads. The entropy truncation threshold value can be a global value for all packets or can vary based on the type of packet. The type of packet can be determined from the header information of the packet.

Various methods or techniques of binary compression (encoder) can be used to reduce the storage space required for computer data packets, but is usually only effective for low entropy data packets. Example compression algorithms include Brotli, Zopfli, bzip2 (Burrows-Wheeler algorithm, Lempel-Ziv-Markov (LZMA) chain, log-structured history data access method (LHAM), and deflate. Binary decompression (decoder) is often included with the compression algorithm (encoder). If data is already compressed or encrypted, making it a high entropy data packet, the data packet typically cannot be compressed further by compression techniques.

Figure 5A:
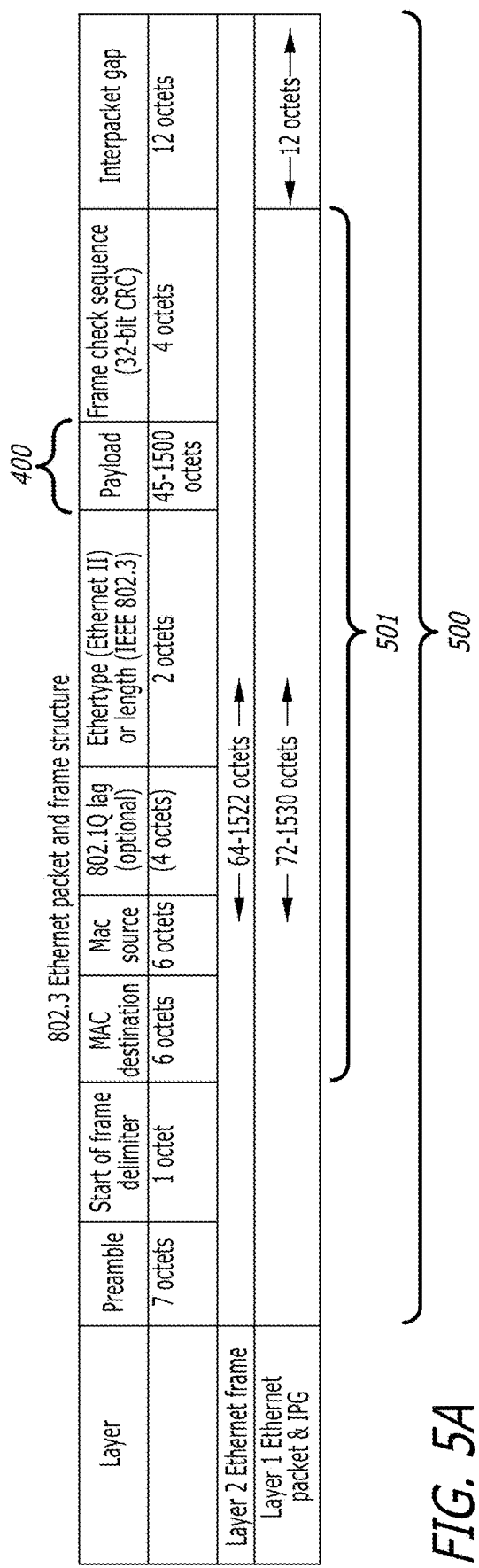
FIG. 5A illustrates an encapsulated frame of data 501 including a packet data payload.

Referring momentarily to FIG. 5A, a frame of data 501 includes a packet data payload 400. The frame of data 501, at the data link level of the open systems interconnection (OSI) model, can be further encapsulated with a preamble, a start frame delimiter, and an interpacket gap as a computer network packet 500. The computer network packet 500 can be sent over a network between computers. The data field (payload data) 400 of the IP packet 500 can include one or more of transmission control protocol (TCP) packets, user datagram protocol (UDP) packets, or stream control transmission protocol (SCTP) packets.

Figure 4A:
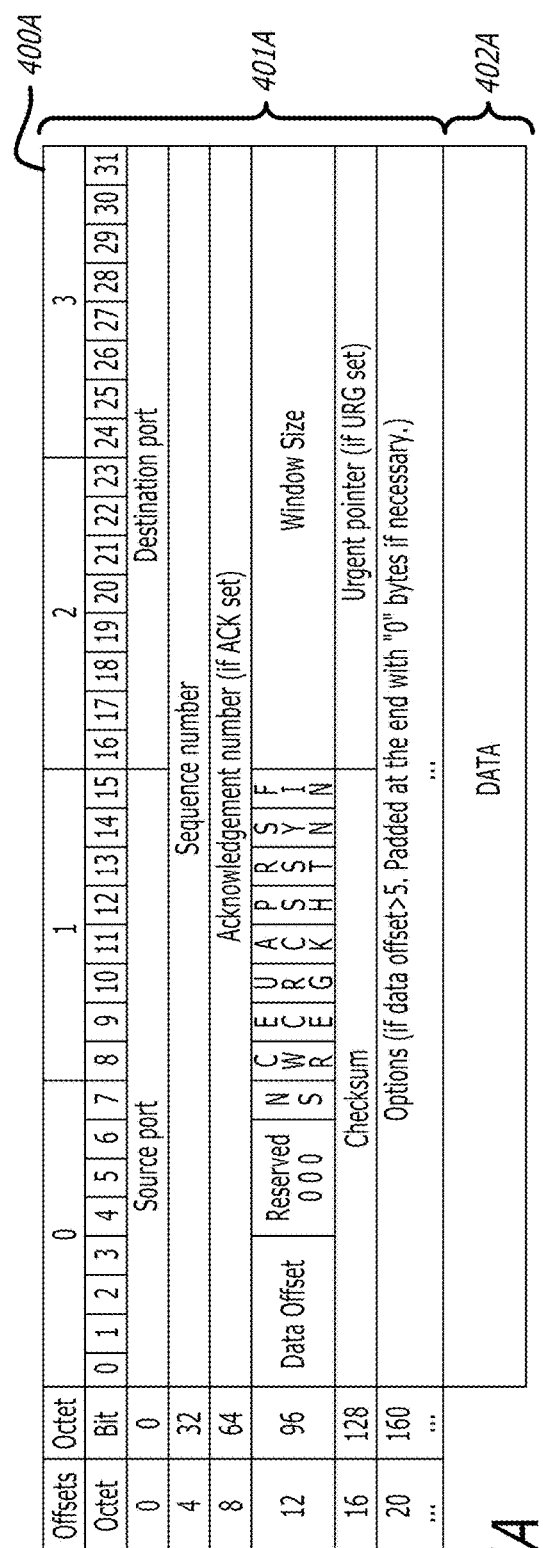
FIGS. 4A-4B illustrate diagrams of exemplary computer network packets.

FIG. 4A illustrates a transmission control protocol (TCP) packet 400 including a header field 401 and a data field 402. The header field 401 of the TCP packet 400 includes a source port number, a destination port number, a sequence number, an acknowledgement number, data offset, reserved field, one or more flags, a window size, a checksum, an urgent pointer, and an options field with zero byte padding to end of a 32 bit boundary. The data field 402 is appended to the header field 401. A plurality of TCP packets (e.g., packets 500A-500N in FIG. 5B) between the same IP addresses and port numbers can be grouped together, to form a conversation or network flow 550.

Figure 5B:
FIG. 5B illustrates a conversation (network flow) of computer network packets between computer devices over a computer network.

FIG. 5B illustrates a conversation (network flow) 550 between one computer and another. The conversation 550 includes a plurality of packets 500A-500N with frames of data over a packet switched (IP) network to make up a stream of data. Network flows can vary widely in size (the number of packets) from conversation to conversation. Entropy can be calculated per packet without having to track network flows and hold states. Calculating entropy per packet reduces implementation costs of truncating data from the packets so that the amount of data storage in a network probe can be reduced.

The packets and frames of data can be evaluated for entropy and storage value (or utility value) in storing for incident evaluation. Accordingly, some frames of data have lower utility value for capture and storage in a network probe than other frames of data. For example, a frame of data with encrypted content is a high entropy frame of data. Further, if there are no keys available to decrypt the data, the encrypted data has low storage value or low utility value for storage in a network probe. As another example, a frame of data carrying highly compressed commodity data (e.g., a media stream such as movies, TV, music) is a high entropy frame of data. Because it can be recreated, compressed commodity data has low storage value or low utility value for storage in a network probe. On the other hand, plain text data can have a high storage value or high utility value in incident evaluation. For example, a frame of plain text data that is for a web page or a call to a web page would be of high utility value. As another example, call setup information in a frame of data for a telephone call (e.g., VOIP) can have a high utility value for storage. Packets that provide some clue with regard to security information can be of high utility value to track down a security incident. Packets to track performance information typically have a high utility value for storage as well to debug network problems. Accordingly, entropy of a packet is often inversely proportional to the storage value or utility value of a packet for storage in a network probe.

Figure 3:
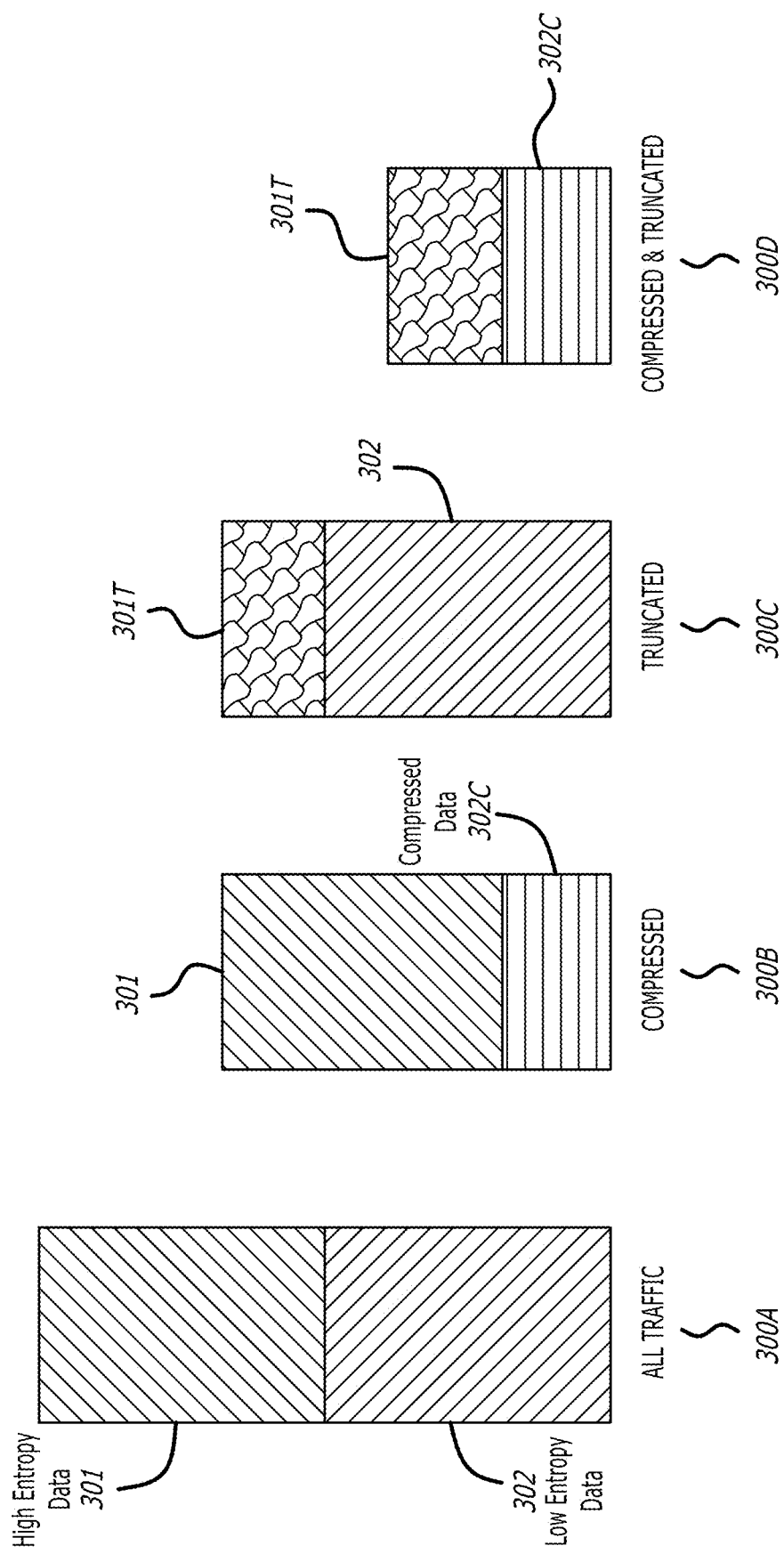
FIG. 3 illustrates graphs of storage volume for data packet traffic and various methods of decreasing storage usage.

FIG. 3 illustrates graphs 300A-300D of storage volume for data packet traffic and various storage savings methods that can be used to decrease storage usage in a network probe. Without any storage savings methods employed, all data packet traffic is stored in a network probe. Assume that 50% of the data traffic in a network that could be stored is made up of high entropy data 301 while the other 50% of data traffic is made up of low entropy data 302 such as shown by bar graph 300A in FIG. 3. The low entropy data 302 can be plain English text of web pages, for example, that can have high utility value. The high entropy data 301 is encrypted data for example that does not compress well. Encrypted data is likely to be of low utility value because it cannot be decrypted. However in some cases, a higher utility value can be present for the encrypted data (such as for a particular application or a particular TCP port) and it can be desirable to save the encrypted data instead of unencrypted data.

High entropy data 301, being encrypted or already compressed, is difficult to compress and results in little, if any, data compression when compressed again. Low entropy data 302 usually compresses well and can be compressed into compressed data 302C as shown by bar graph 300B in FIG. 3. If compression methods are used alone, the low entropy data can be compressed, such as by about 30% resulting in about 70% of the data still being stored.

High entropy data 301 being compressed or encrypted frames of data, typically have a low utility value. Accordingly, the data payloads of compressed or encrypted frames of data can be truncated into truncated data 301T, such as shown by bar graph 300C in FIG. 3. Packets with low entropy usually have frames of data that are of higher utility value and worth saving. Accordingly, low entropy packets are usually not truncated. Truncation of data payloads in low utility value frames can result in a thirty (30) percent savings for high entropy data, for example. If truncation methods are used alone, the high entropy data can be truncated such as by about 30%, resulting in about 70% of the data still being stored.

However, not all packets with high entropy may have a low utility value. Accordingly, the entropy information can be combined with other information such as Source/Destination IP address, Source/Destination Layer 3 Port, Application type etc. to determine the type of truncation operation to apply. For frames of data being classified as having low utility value, the payload can be partially truncated before capture, or completely truncated such that the frame of data can be dropped.

Generally, packets have packet headers and payload data. Instead of treating packet headers and payload data the same, compression and truncation can focus on the payload data. Generally, compression of payload data saves storage bandwidth, and storage space but requires processing power. Generally, truncation of payload data saves capture bandwidth, processing power, storage bandwidth, and storage space. By truncating high entropy packet payloads, instead of discarding the packet in its entirety, protocol analysis can be still be performed on the packet headers.

By using a high and/or low entropy threshold on a measure of entropy for packets, all packets of data traffic can be sorted into packet payloads with high entropy and packet payloads with low entropy. By using both truncation techniques and compression techniques can during the packet capture process, the amount of data that is stored in a network probe can be reduced and data retention time of the network probe can be increased.

The packet payloads with high entropy 301 and low utility value that cannot be easily compressed have their payloads truncated into truncated data 301T. The packet payloads with low entropy 302 and high utility value that can be easily compressed have their payloads compressed into compressed data 302C. With truncation and/or compression being applied to the various computer packet data to be stored, a reduction of 60% from the original storage size, for example can be achieved with truncated data 301T and compressed data 302C being stored, such as shown by bar graph 300D.

Figure 4B:
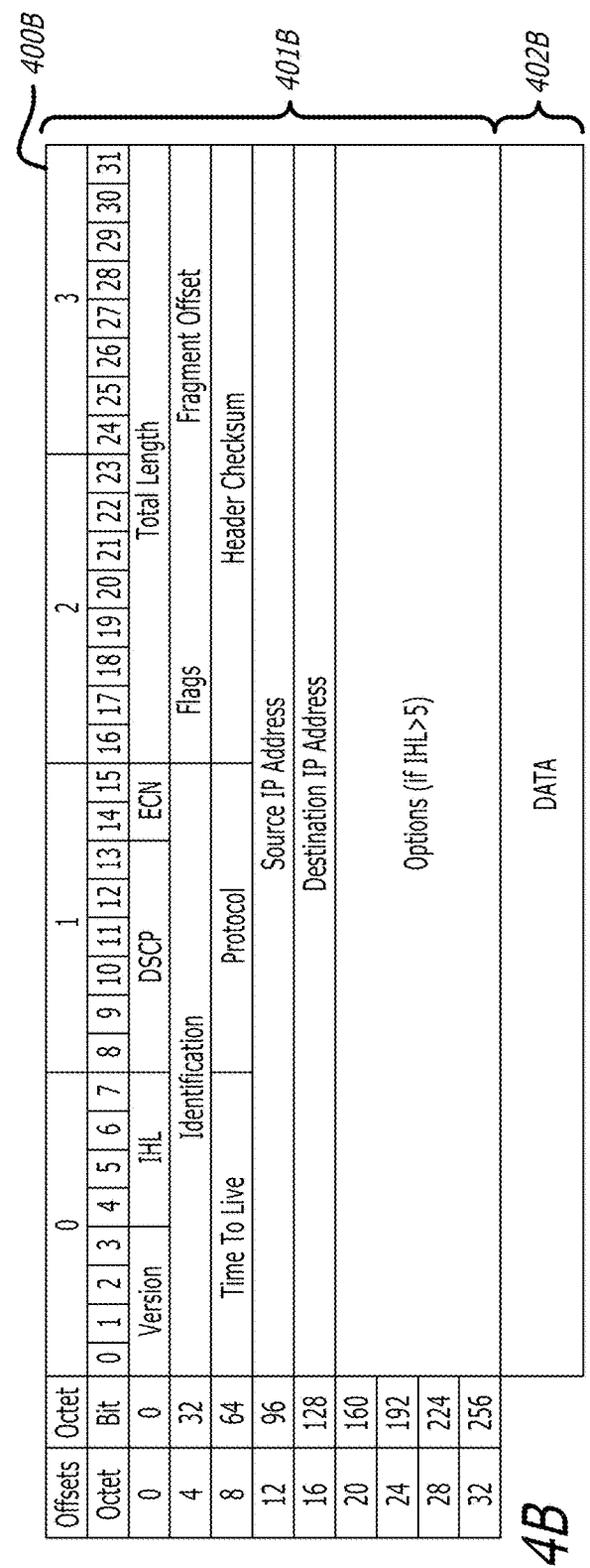

Referring now to FIG. 4A, a data payload 400A (e.g., a TCP packet) with a header field 401A and data field 402A is shown listing octet fields and bit fields that are communicated as a bit stream within an encapsulated packet (e.g., packet 500 in FIG. 5A) between computer devices over a computer network. FIG. 4B illustrates an alternate data payload 400B (e.g., an IPv4 packet) with a header field 401B and a data field 402B.

FIG. 5A is a diagram illustrating an example computer network (internet protocol (IP)) data packet 500, such as an Ethernet packet, with a data frame 501. The computer network data packet 500 includes a preamble, a start frame delimiter, the data frame 501, and an interpacket gap. The data frame 501 includes a header field and a data field. The header field of the data frame 501 includes a destination or receiver media access control (MAC) address, a source or sender MAC address, and a field for other header information such as ether-type before the payload data 400 is to be sent. The data frame 501 further includes a frame check sequence, a cyclic redundancy check (CRC) field, to check for bit errors and possible correct for errors.

To form a record packet, additional fields can be inserted into the header field or data field of the Ethernet packet 500; or the header field or data field of the data frame 501; or within the header (e.g., reserved field) or the data field 402 of the payload data 400. For example, a time stamp, a record length, and an entropy level can be appended to the header field or data field of the packet, frame, or payload data. The record packet can be stored, in whole or part as discussed herein, into a network probe for later use in incident investigation or performance evaluation.

Referring now back to FIG. 4A, the header field 401A includes a plurality of bit fields including Source port (16 bits), Destination port (16 bits), Sequence number (32 bits), Acknowledgment number (32 bits), Data offset (4 bits), Reserved (3 bits), Flags (9 bits) (Control bits), Window size (16 bits), Checksum (16 bits), Urgent pointer (16 bits), and Options (Variable 0-320 bits, divisible by 32). The source port identifies the sending port. The Destination port Identifies the receiving port.

The Sequence number is based on a sequence flag SYN. If the SYN flag is set (1), then this is the initial sequence number. The sequence number of the actual first data byte and the acknowledged number in the corresponding acknowledgement flag (ACK) are then this sequence number plus 1. If the SYN flag is clear (0), then this is the accumulated sequence number of the first data byte of this segment for the current session.

The Acknowledgment number (32 bits) is based on the acknowledgment flag ACK. If the ACK flag is set then the value of this field is the next sequence number that the sender is expecting. This acknowledges receipt of all prior bytes (if any). The first ACK sent by each end acknowledges the other end's initial sequence number itself, but no data.

The Data offset specifies the size of the TCP header in 32-bit words. The minimum size header is 5 words and the maximum is 15 words thus giving the minimum size of 20 bytes and maximum of 60 bytes, allowing for up to 40 bytes of options in the header. This field gets its name from the fact that it is also the offset from the start of the TCP segment to the actual data. The Reserved bits are for future use and usually set to zero.

The Flags (9 bits) are also know as Control bits and made up of 9 1-bit flags. An NS (1 bit): ECN-nonce—concealment protection. A Congestion Window Reduced (CWR) bit is a Congestion Window Reduced (CWR) flag that is set by the sending host to indicate that it received a TCP segment with the echo (ECE) flag set and had responded in congestion control mechanism. The echo bit ECE has a dual role, depending on the value of the SYN flag. If the SYN flag is set (1), it indicates the TCP peer is ECN capable. If the SYN flag is cleared (0), that a packet with Congestion Experienced flag set (ECN=11) in IP header was received during normal transmission. This serves as an indication of network congestion (or impending congestion) to the TCP sender.

The urgent bit URG (1 bit) indicates that the Urgent pointer field is significant. The acknowledgement bit ACK (1 bit) indicates that the Acknowledgment field is significant. All packets after the initial SYN packet sent by the client should have this flag set. If the push function bit PSH (1 bit): is set it asks to push the buffered data to the receiving application. If the reset bit RST (1 bit) is set, it resets the connection.

If the Synchronize sequence numbers bit SYN (1 bit) is set, the sequence number numbers are to be synchronized. Only the first packet of the sequence sent from each end should have this flag set. Some other flags and fields change meaning based on the SYN flag, and some are only valid for when the SYN bit is set, and others when the SYN bit is clear. The finish bit FIN (1 bit) is set to indicate that it is the last packet in the sequence from the sender for a period of time.

The Window size (16 bits) indicates the size of the receive window. The receive window specifies the number of window size units (e.g., bytes) (beyond the segment identified by the sequence number in the acknowledgment field) that the sender of this segment is currently willing to receive.

The Checksum (16 bits) field is used for error-checking of the header, the Payload and a Pseudo-Header. The Pseudo-Header consist of the Source IP Address, the Destination IP Address, the protocol number for the TCP-Protocol (0x0006) and the length of the TCP-Headers including Payload (in Bytes).

The Urgent pointer (16 bits) flag URG when set, is 16-bit field that is an offset from the sequence number indicating the last urgent data byte. The Options (Variable 0-320 bits, divisible by 32) field has up to three fields: an Option-Kind (1 byte) field, an Option-Length (1 byte) field, and an Option-Data (variable) field. The Option-Kind field indicates the type of option, and is the only field that is not optional. Depending on what kind of option field is present, the next two fields may be set. The Option-Length field indicates the total length of the option. The Option-Data field contains the value of the option, if applicable.

The Padding field is TCP header padding that is used to ensure that the TCP header ends and data begins on a 32 bit boundary. The padding is composed of zero bits.

Referring now back to FIG. 4B, the header field 401B of the IP packet 400B includes a version field, a header length field, a differential services code point (previously a type of service field), explicit congestion notification field, a total length field, a packet identifier, flags, a fragment offset field, a time to live (TTL) field, a protocol field, a header checksum, a source IP address, a destination IP address, and optionally, a field of a number of bytes of optional header information.

A timestamp can be added to each packet (e.g., FIGS. 4A-4D, 5A) in a uniform manner (e.g., optional header field, reserve field, added to data field) to identify the different dates and times the packets are received by a network device. The timestamp can be used to evict the oldest data in storage if a storage device becomes filled with data to its storage capacity.

In FIG. 5B, the network traffic into and out of a data center or local area network can be organized into network flows of network packets forming conversations between processes or computers. A network flow is one or more network data packets sent over a period of time for a given communication session between two internet protocol (IP) addresses. A network flow record (netflow record) can be generated to summarily identify a network flow of computer network data packets between two computer devices associated with the two internet protocol (IP) addresses. If it is desirable to free up space in a storage device, the network flow record can be of use to quickly identify conversations that are older that others so that the older conversations can be deleted.

A conversation between two computer devices can be identified when encrypted, such as with web pages using a hyper text transfer protocol secure (HTTPS) communication protocol. In the case of HTTPS, there are several phases to the session of the conversation. There is an initial TCP connection setup. After the initial TCP connection setup, there is a cryptographic handshake. The handshake is not itself encrypted, and thus can contain some valuable information in plain text, such as the server name, the TLS version, and the cypher used. The certificate expiry date may also be available. The handshake exchange has moderate entropy and hence can be captured without truncation with an appropriate entropy threshold value. Once the session encryption starts with encrypted payloads in the computer data packets, the estimate entropy is very high and the utility value for recording/storage is very low. The subsequent packets with encrypted payloads can be truncated without valuable information loss.

Figure 6:
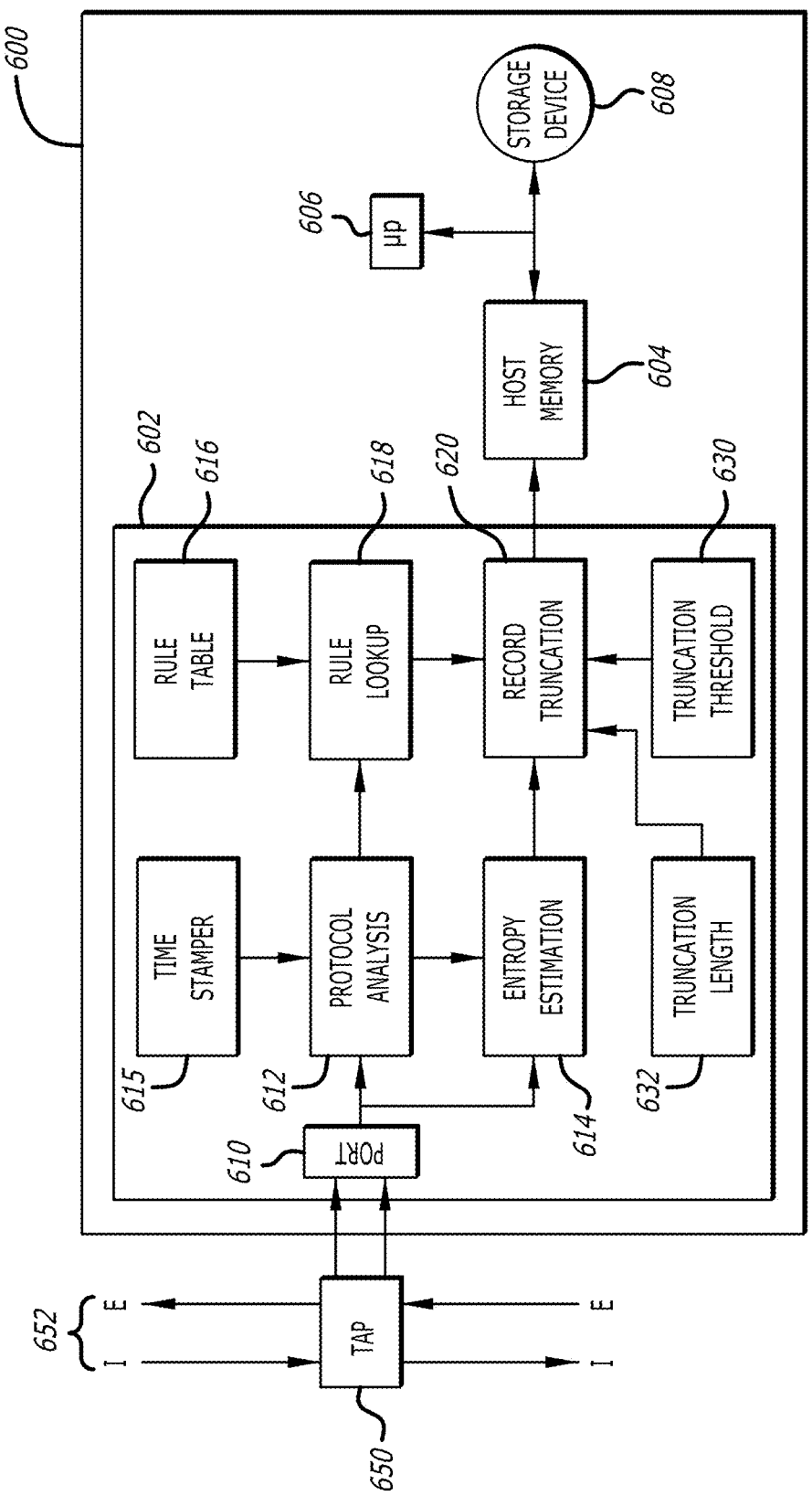
FIG. 6 is a functional block diagram of a packet capture system with selective packet truncation.

Referring now to FIG. 6, a functional block diagram is shown of a packet capture system 602 in a network recorder 600. The packet capture system 602 in the network recorder has selective packet compression and truncation based on data entropy and utility value (storage value). The packet capture system 602 can be implemented by one or more data acquisition and generation (DAG) printed circuit board cards 210,220. The packet capture system 602 is coupled to a Tap, Port Mirror, or Packet Broker 650. The packet capture system 602 is further coupled to a host memory 604 that is in turn coupled to a microprocessor 606 and a storage device 608.

The tap 650 monitors a network link 652 for incoming (ingress) packets (I packets) and outgoing (egress) packets (E packets) (collectively referred to as network packets) from a network of computer devices (e.g., servers) coupled in communication together and to the tap 650. Under control of the microprocessor 606, the host memory 604 is used to temporarily store one or more packets and/or one or more truncated packets. The microprocessor 606 can move the packets and truncated packets stored in the memory 604 into a storage device 608 such as a hard drive or solid state storage drive for a longer period of storage.

The packet capture system 602 includes an input port 610, a protocol analyzer 612, an entropy estimator 614, a time stamper 615, a rule table 616, a rule applicator 618, a record truncator 620, an entropy threshold register 630, and a truncation length selector 632.

From the tap 650, the capture system 600 receives a network packet at its input port 610. The protocol analyzer 612 of the capture system performs a protocol analysis to determine the protocol information. The protocol information is passed to the rule applicator 618 and the truncation length selector 632.

The protocol analyzer 612 during the protocol analysis of the packet also discovers the application data payload offset therein in order to identify the beginning data bytes for entropy analysis. The payload offset is passed to the entropy estimator 614.

The packet is also coupled into the entropy estimator 614. With the payload offset, the entropy estimator 614 can ascertain the start of the application data payload to perform an entropy analysis. The entropy estimator 614 performs the entropy analysis of the payload in hardware and generates an entropy estimate for the associated packet. The entropy estimate is coupled into the record truncator 620 and recorded into the header of the packet forming a packet record. The packet is passed to the record truncator 620.

The rule applicator 618 receives the protocol information. The protocol information is compared to a rule table 616 to determine if there is a rule to apply that the packet is a candidate for truncation, discarding, or storage. The candidacy information of the packet is coupled to the record truncator 620 and the truncation length selector 632. The rule table 616 includes one or more truncation rules that can be applied to each packet.

A truncation rule can be a custom user defined rule. A truncation rule can be based on the type of packet being received or other protocol information as gleaned from the header information. For example, a TCP packet with a given port number can have a custom truncation rule associated with it that disables truncation, such that all packets with that given port number are saved without payload data truncation. On the other hand, a different truncation rule with a different given port number can have TCP packets stripped completely of the payload data while the header information is saved. Generally, a truncation rule can include virtual local area network identification (VLAN ID or VID), an IP protocol (e.g., TCP), source or destination address and mask, port number (e.g., 443 for HTTPS), truncation/entropy threshold, truncation length, and enable or disable truncation.

The truncation length selector 632 sets the amount of data payload that is to be truncated based on the candidacy information of the packet and the protocol information. Various lengths of truncation can occur to the packet payload 402A-402B, such as shown by comparing packet 400A in FIG. 4A, with the truncated packets 400T,400T' in FIGS. 4C-4D. As shown by the truncated packet 400T in FIG. 4C, the entire packet payload data can be truncated leaving just the header 401A. As shown by the truncated packet 400T' in FIG. 4D, most of the payload data can be truncated but for a data portion 402T, such as the first one or more M bytes of the payload data. In other cases, all but the first and last one or more bytes of the payload data can be truncated to form the data portion 402T. In other cases, even bytes of the payload data can be truncated, or odd bytes of the payload data can be truncated to form the data portion 402T. The amount of truncation is responsive to a global byte truncation length, or a byte truncation rule that is applied to the payload data based on the candidacy information and the protocol information in the header. The truncation length selector 632 can also indicate the entire packet is to be discarded. In another case, the truncation length selector 632 can indicate the entire packet is to be stored.

The record truncator 620 receives the packet, the candidacy information, the entropy estimate, and the predetermined entropy threshold level. If the candidacy information indicates the packet is a candidate for truncation, the record truncator 620 compares the entropy estimate for the packet with the predetermined entropy threshold level. If from the comparison it is determined that the entropy estimate for the packet exceeds the predetermined entropy threshold level, the payload data of the packet is truncated subject to the selected length of truncation set by the truncation length selector 632. The record truncator 620 thereby forms a truncated packet 400T,400T'. The record truncator 620 generates a captured packet record by including the entropy estimate into the truncated packet. The captured packet record is coupled into the host memory 604 for temporary storage and further analysis.

The host microprocessor 606 can further examine the packet and the Entropy estimate, and apply additional criteria, such as Application ID for example, to determine payload value for storage. Even with payload truncation, the host microprocessor 606 can perform a protocol analysis on packet headers. Based on this further analysis, the microprocessor 606 can optionally compress the packet record if not previously done, truncate the packet if not previously done, or discard the packet in its entirety. The microprocessor 606 can utilize various known binary compression algorithms to compress the packet payload. In other cases, a separate hardware compression accelerator can be used to perform the data compression, such as INTEL's Quick Assist Technology (QAT) either as an add-in PCI daughtercard, or integrated into a chipset on the motherboard or DAG card.

Accordingly, if the microprocessor 606 determines the packet is a high value low entropy packet, packet records can be compressed efficiently. If the microprocessor 606 determines the packet is a high value compressed packet record or a truncated low value packet record, it can store them compactly.

Regardless, the retained packet records are processed by the host microprocessor 606, such as moving them from temporary storage in memory 604 to a longer storage period in the storage device 608.

Figure 7:
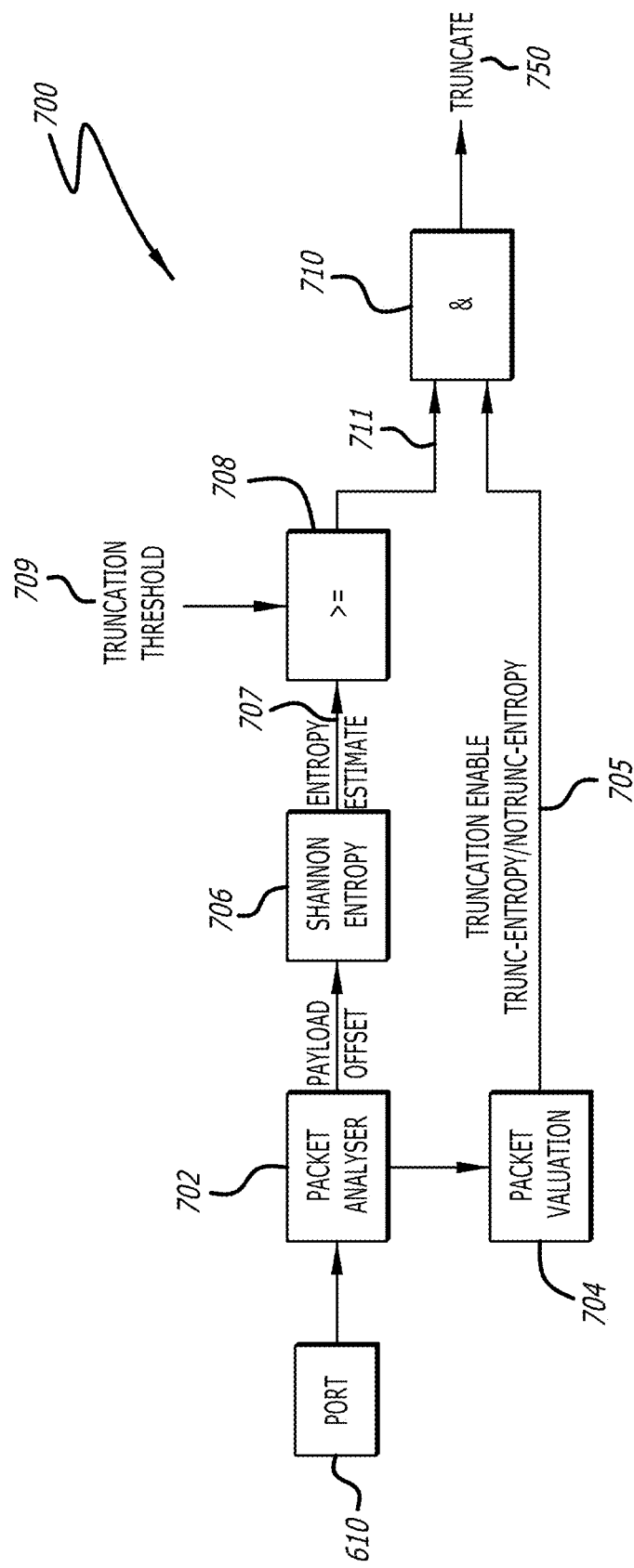
FIG. 7 is a block diagram illustrating a process and system for deciding whether or not to truncate a payload data of a packet.

Referring now to FIG. 7, a process 700 performed by the packet capture system 602 is shown for deciding whether or not to truncate a network packet. The port 610 receives the network packet and passes it on for analysis by a packet analyzer 702. The packet analyzer 702, also referred to as a protocol analyzer or a protocol dissector, can readily discern the various header fields and payload data in the packet. The bits, bytes, and octets of the packet are analyzed by the packet analyzer 702. The packet analyzer 702 can also perform error detection/correction and decapsulate the network packet. The packet analyzer 702 understands the OSI model of network packets such that it can perform a search for the relevant fields of the various packets described herein with reference to FIGS. 4A-4B. The packet analyzer 702 determines the payload offset of the packet where the payload data is found in the given packet. The payload offset indicates the start and end of the payload data within the packet. The payload offset and packet are passed from the packet analyzer 702 to the entropy calculator 706. The packet analyzer 702 also determines where the header is at and the fields of information in the header that are useful to perform smart truncation based on other factors in addition to the calculated entropy value of the packet. Selected fields of the header information are coupled into packet valuation logic 704 (e.g., a look up table with truncation rules).

The entropy calculator 706 uses the payload offset to acquire the payload data and calculate the entropy of the packet in accordance with the Shannon theory described herein. The entropy of the packet payload is selected as a metric to determine compressibility of the payload data because it can be calculated at high bandwidths in hardware. The entropy of the packet has good correlation to compressibility of data such that it can distinguish between encrypted or compressed content versus uncompressed or unencrypted content. The entropy value is calculated on a per-packet basis without requiring flow context and state tracking, which lowers the cost of implementation and allows parallelization.

The entropy of the packet payload is estimated as the probability of the distribution of octet values compared to an expected uniform probability. The entropy estimate is expressed in digital bits where 8.0 represents maximum entropy (zero compressibility) and 0 represents minimum entropy (maximum compressibility). The entropy calculator can be implemented in hardware, software, or a combination of hardware and software to estimate the entropy value of the payload data.

In a hardware implementation of the entropy calculator, for example, level four of the OSI model is used. The payload data of the captured packet is examined one octet at a time for symbol values. A number of counters matching the number of possible symbol values are used to keep track of the number of occurrences of each symbol value present in the packet payload data. With two hundred fifty-six (256) symbols total, two hundred fifty-six (256) counters are used to keep track of the number of occurrences in the payload data. Each counter is assigned an index value over the range 0-255 of index values. For each octet, one of the 256 counters is incremented by 1 when a symbol is detected in the packet payload. The index value of the counter corresponds to the value of the symbol detected in the octet.

After having processed all the payload octets in the payload, the set of 256 counters holds the counts of the occurrences of each symbol value in the payload data of the given packet. The value in each counter can be normalized by dividing the value by the total number of octets processed, yielding a normalized value between 0.0 and 1.0.

The entropy estimate is then calculated by summing the normalized count for each symbol multiplied by the log(base 2) of the normalized count for that symbol. With the normalized value between 0.0 and 1.0, log(base2) is a negative number. Accordingly, the resultant negative number is then negated to obtain a positive entropy value.

In pseudo code, an example software implementation of the entropy calculator is as follows:

```
/* array of 256 counters, one per symbol value for histogram */
uint16_t hist_bytes[256] = {0};
/* Calculate histogram of symbol values across the payload buffer */
for (i=0; i<buf_len; i++) {
    hist_bytes[flds->pload_ptr[i]]++;
}
/* sum normalised count multiplied by log2 of normalised count */
for (i=0; i<256; i++) {
    if (hist_bytes[i])
        entropy += ((double)hist_bytes[i]/buf_len) *
log2(((double)hist bytes[i]/buf_len));
}
/* negate */
if (entropy == 0)
    return 0;
return -entropy;
```

The normalization in the pseudo-code can be optimized, and pre-generated tables can be used for the logarithm calculations and divisions. Furthermore, an incremental implementation is more tractable in hardware, avoiding the final summation loop across the 256 counters.

After the entropy calculator 706 makes the calculation, the entropy value 707 of the packet is coupled into a comparator 708. The comparator 708 also receives a truncation threshold 709 for comparison with the calculated or estimated entropy value 707 associated with the packet. The comparator 708 determines if the entropy value 707 is greater than or equal to the truncation threshold 709 to distinguish between with packets with high entropy and packets with low entropy. If the estimated entropy value 707 is greater than or equal to the entropy truncation threshold 709, the comparator 708 generates an entropy exceed signal 711.

Low entropy indicates uncompressed and/or unencrypted data so the data in the packet generally has a higher value of retention or storage. High entropy indicates compressed and/or encrypted data so the data in the packet generally has a lower value of retention or storage. By applying the truncation threshold 709, packets with low entropy (and/or high value) can be retained in full, while packets with high entropy (and/or low value) can be truncated in order to reduce capture bandwidth and the storage space that would otherwise be used. As described herein, the amount of truncation to the payload data can vary (e.g., entire packet, all or a portion of the payload data) if the packet is subject to truncation.

Truncation of the payload data can be based on the entropy alone or a smart truncation can be made that is further based on packet header information in the packet. The value of the entropy truncation threshold 709 can be a variable. A different entropy truncation threshold 709 can be provided to the comparator 707 depending on packet header characteristics. This is useful because the utility value of a packet may not always correspond directly to the entropy of the payload data.

In parallel with the calculation of packet entropy, the packet analyzer 702 analyzes the packet for the packet header. Protocol information fields are extracted from the packet. Certain characteristics of the packet header (e.g., the protocol information field) are coupled into packet valuation logic 704 to make an additional evaluation of whether or not to truncate payload data of a packet. The packet valuation logic 704 generates a truncation enable signal or a truncate candidate signal 705 based on the packet header.

In one embodiment, the packet valuation logic 704 is a ternary content addressable memory (CAM) that functions as a look up table in the generation of the truncation enable/disable signal. Rules are stored in the look up table (LUT) (e.g., rule table 616 shown in FIG. 6) to evaluate the utility value or the storage value of storing a packet in a storage device based on the header information. In another embodiment, the packet valuation logic 704 can be hard coded or programmable logic that analyzes header information in the generation of the truncation enable signal.

The truncation rules stored in the look up table can be a table of user generated truncation rules. The protocol information fields are extracted from the packet and used in the look up table of user generated truncation rules to generate the truncation signal. The user that programs the lookup table/valuation logic with truncation rules often has domain knowledge about the network that can allow adaptation and customization of the truncation policy to specific needs, and specific values of different network information known by the user. That is, truncation of packet data is user customizable.

The truncation rules can set a utility or value of the payload data and indicate if the packet is a candidate for truncation or not. In the case of a look up table, the header information is looked up by a matching unit in the packet valuation logic 704, which produces a truncation enable or a candidate signal 705. The truncate enable signal 705 generated by the matching unit of the packet valuation logic 704 is coupled into the decision block 710. The truncate enable signal 705 and the entropy exceed signal 711 are combined together by the decision block 710 (e.g., an AND gate) to determine if the packet is to be truncated or not.

The truncation rules act like a filter or a set of logical operations performed on selected header information in the generation of the truncate enable signal (e.g., logic high) in response to the receipt of the packet. For example, if a truncation rule is set that all encrypted packets are to be truncated, a field indicating an HTTPS type of packet can be used to generate the truncate enable signal regardless of other header information. On the other hand, a truncation rule can be set to a specific IP or mac address with sensitive information that it is important to save packets with this IP or mac address, regardless of other header information. In this case, the truncate enable signal is not generated to avoid truncating payloads with packets having this IP or mac address that have such high value.

The truncation rules can also set the truncation threshold coupled into the comparator 708, packet by packet, based on the protocol information in the header to selectively truncate packets differently. If a packet truncation threshold is not set by a truncation rule, a global entropy truncation threshold is used for comparison by the comparator 708. The truncation rules can also set the length of truncation applied to the payload data by the device performing the truncation, such as the record truncator 620 shown in FIG. 6.

Generally, a user will have contextual information about what is important in a data center, such as the addresses or subnets of computer servers exposed to the internet, or what computer services in the data center are operating. This contextual information can be used to determine the relative value of packet traffic (flow of packets into and out of the data center/servers) for later analysis, and hence determining a retention policy. The retention policy is used to generate the truncation rules for the look up table and the generation of the truncate enable/disable signal. The truncation rules in the look up table can be used to retain high value packets by disabling truncation for high value or vulnerable systems, and/or by altering the entropy truncation threshold used for truncation. Generally, assuming truncation is enabled by the truncation enable signal 705, a lower value for the entropy truncation threshold 709 can increase the number of packets that are truncated.

By programming the matching unit with a truncation rule, either a 'truncate by default policy with specific exceptions, or a no truncation by default except in specific cases' policy can be formulated. Not truncating by default is a conservative policy, if a user is concerned about truncating potentially valuable information. In this case, only data known to have a low value is truncated. A truncation by default policy works when the network data traffic is well understood and the risk of incorrect truncation is low. In this case, only data with known high value is explicitly exempted from truncation.

If the received truncate enable signal 705 indicates a packet is a candidate for truncation, the comparison output from the comparator 708 is used by the decision block 710 to generate a truncate signal 750. The decision block 710 can be an AND logic gate that logically ANDs the truncate enable signal 705 and the entropy exceed signal 711 together to generate the truncate signal 750. The truncate signal 750 indicates that a device (e.g., record truncator 620)—should truncate all or a part of the payload data to conserve storage space.

In this case, the comparison of the calculated entropy value of the packet with the per-rule or global truncation threshold 709, determines if payload data in a packet is to be truncated or not. Accordingly, if the calculated entropy value 707 is greater then the truncation threshold 709, the packet payload is truncated to the per-rule truncation length or a global truncation length. Note that, the truncation length can optionally be measured from the start of the packet, or from the start of the payload.

The system of packet truncation 700 has a number of advantages. The protocol analysis and entropy estimation are fully stateless processes. That is, no information about each flow is stored or retrieved per packet. The stateless process greatly simplifies the implementation of the system and reduces implementation cost because no state memory is needed. Moreover, each packet is independently and completely processed in the protocol analysis and the entropy estimation processes. Accordingly, the protocol analysis and the entropy estimation processes can be performed in parallel by the system.

Data Center Overview

The embodiments are typically found in a network appliance or network device such as a network recorder, also referred to as a probe. Referring now to FIG. 1A, a block diagram of an exemplary data center computer network 100A is shown. The data center computer network 100A includes, without limitation, a router 168, a firewall 166, a tap 400, a network recorder (NR) 170, netflow generators NGAs 200A-200D, netflow collectors (NFCs 162A-162D, a central NFC 164, a network switch 110A, one or more servers 112A-112B, one or more tiered storage appliances 114A-114B, one or more storage array appliances 116A-116B, and one or more flash appliances 118 coupled together by one or more high speed networking cables (e.g., Ethernet 111A-111B, Fibre Channel 113A-113G) to form a local storage area network (LAN) 101.

The network recorder (NR) 170 captures and stores computer network packets for incident evaluation over a period of time. Packet truncation more efficiently stores computer network packets into the network recorder to increase its typical retention period when full.

Each NGA 200A-200D is coupled to the NR 170 to receive ingress and egress Ethernet packets for analysis and generation of netflow records (NFR). A netflow record is a summary of a conversation of a plurality of packets between at least two networked computer devices (e.g., client computer and server computer). Each NGA 200A-200D is further coupled to the network switch 110A so that netflow records can be routed to a plurality of NFCs. Each NFC 162A-162D is also coupled to the network switch 110A and the central NFC 164.

A pair of servers 112A-112B, also referred to as storage initiators, are connected to the network switch 110A via Ethernet cables 111A-111B terminating in Ethernet cards 120A-120B installed on servers 112A-112B. The servers 112A-112B further have Fibre Channel host bus adapter cards 122A-122B respectively installed into them.

A target network device (also referred to herein as a storage target) includes Fibre Channel cards 124A-124C installed to receive signals, including a storage request, from the servers 112A-112B off of wires or cables, such as Fibre Channel cables 113C-113D. The target network device can be one of the tiered storage arrays 114A-114B, the storage arrays 116A-116B, or the flash appliance 118 (referred to collectively as storage array appliances). Fibre Channel cards 124A, 124B, 124E, 124F, and 124G can be installed in the storage array appliances 114A, 114B, 116A-116B and 118.

The servers 112A-112B have Fibre Channel host bus adapters 122A-122B that are coupled to the Fibre Channel cards 122A-B, 124E-G in the storage array appliances 114A-114B, 116A-116B and 118. The Fibre Channel host adapters 122A-122B can differ somewhat from the Fibre Channel cards 122A-B, 124E-G because the server 112A, 112B is an initiator and the storage array appliances 114A-114B, 116A-116B, 118 are targets.

The connections between servers 112A-112B and the storage array appliances 114A, 114B, 116A, and 116B are via fiber cables 113A, 113B, 113E, 113F, and 113G that terminate at one end at the Fibre Channel cards 124A, 124B, 124C, 124E, 124F, and 124G of the storage array appliances 114A, 114B, 116A and 116B.

One or more clients 150A-150N can interface with the data center computer network 100A over a wide area network 102, such as the Internet or World Wide Web. The one or more clients 150A-150B can request one or more server functions of the servers 112A-112B for software applications and/or storage capacity provided by the storage arrays or appliances 114A-114B, 116A-116B, 118 to store data. Servers/storage arrays in the data center 100A can communicate with the one or more remotely located clients 150A-150N over the WAN 102.

One or more malicious clients 152A-152N can pose a security threat to the data center computer network 100A.

Accordingly, a user (e.g., network administrator) can manage security of the data center computer network 100A via tools, such as an analyzer 156L and a management console 158, including a monitor and a keyboard. The analyzer 156L and the management console 158 are coupled to the central NFC 164. Alternatively, the user can manage security of the data center computer network 100A remotely over the Internet cloud 102. For example, the user can manage security of the data center computer network 100A via tools, such as a remote analyzer tool 156R and a remote management console 154, including a monitor and keyboard. The remote analyzer 156R and the remote management console 154 are in communication with the central NFC 164.

Figure 2A:
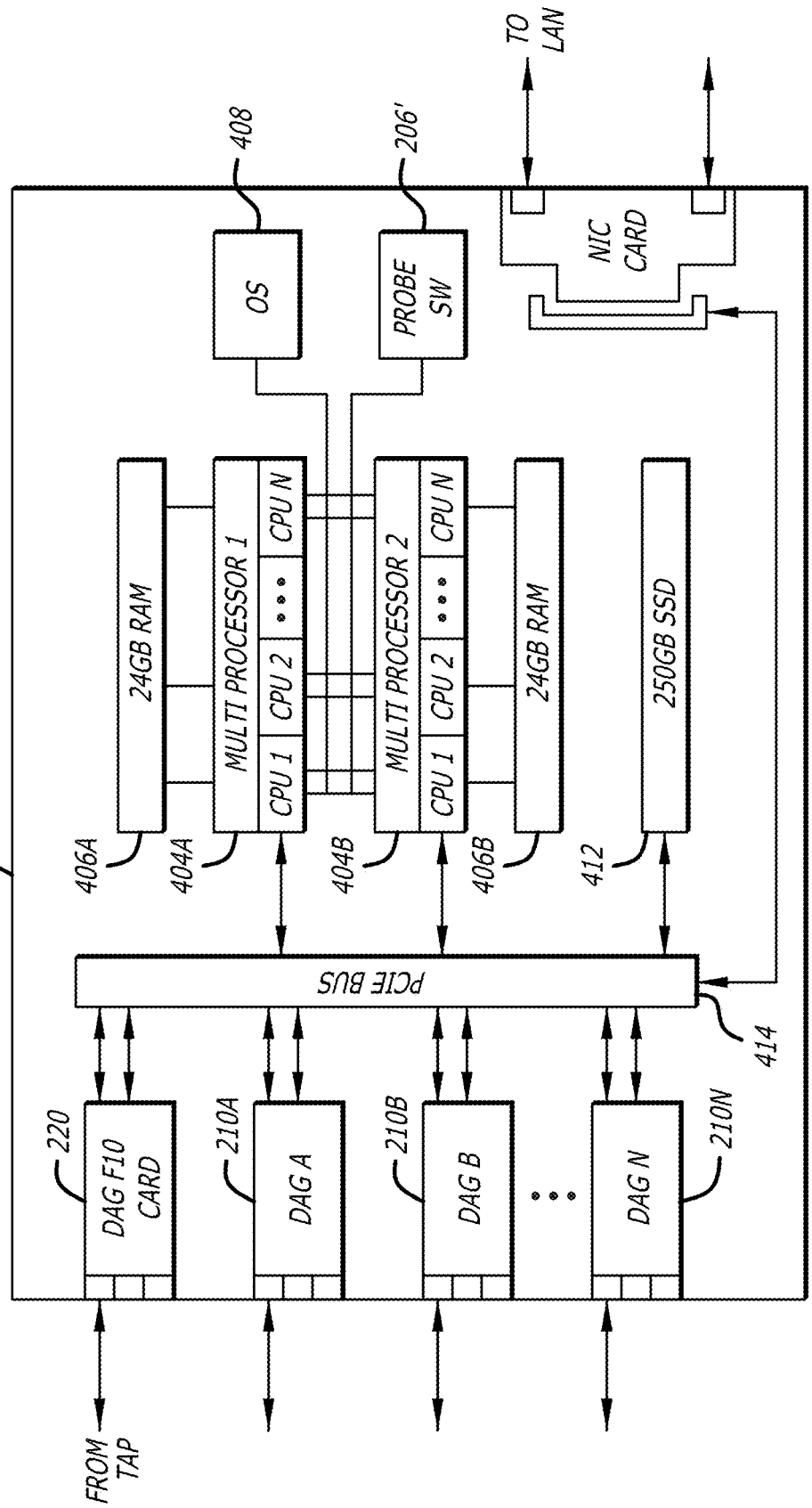
FIG. 2A illustrates a functional block diagram of a network recorder (NR), also referred to as a probe.

FIG. 2A is a more detailed block diagram of the network recorder or probe (NR) 170, according to one embodiment. The NR 170 includes a data acquisition and generation (DAG) card 220, DAG cards 210A-210N (where N is a positive integer), a PCIe bus 414, a RAM 406A, a multiprocessor 404A, a multiprocessor 404B, a random access memory (RAM) 406B, a solid-state drive (SSD) 412, an operating system (OS) 408, probe software 206', and a network interface card (NIC) card coupled to an NIC socket.

The DAG cards 210A-210N have programmable logic devices that can be programmed by firmware to provide the selective truncation of packets for use in the network recorder or a merged tap/network recorder. Each DAG card is a daughter-card that is removeably coupled to the PCIe bus 414 through its PCIe edge connector and a PCIe socket of a motherboard or base printed circuit board. The PCIe bus 414 is coupled to the multiprocessor 404A, the multiprocessor 404B, the SSD 412, and the NIC socket. The multiprocessor 404A, the multiprocessor 404B, the RAM 406, the RAM 406B, the OS 408, and the probe software 206' are coupled in communication together.

The network recorder 170 can be merged with the tap 400. The tap 400 duplicates each packet while the network recorder saves the duplicate packet. The merged tap/NR 400 basically manages each data packet for duplication so that the data center can process a primary copy for the completion of the task. The merged tap/NR 400 processes a secondary copy (e.g., clone) for substantially all of the potential threats that could be associated with the packet. The tap/NR 400 can also log threats by timestamp for reporting and management purposes. The tap/NR 400 also performs the packet truncation described herein to conserve storage space for longer retention time of the higher valued packets of data.

Figure 2B:
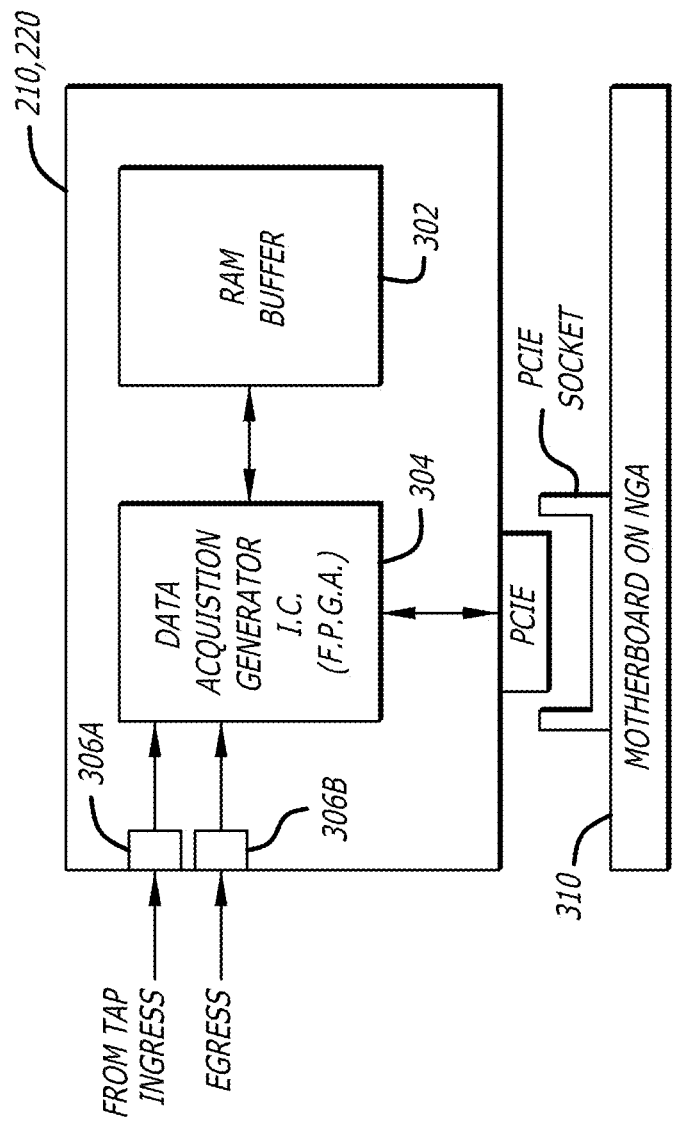
FIG. 2B illustrates a functional block diagram of a programmable data acquisition and generation (DAG) printed circuit board card (daughter-card) with a PCIE edge connector plugging into PCIE socket on a motherboard of the network recorder shown in FIG. 2A.

FIG. 2B is a more detailed block diagram of an example DAG card 210,220 according to one embodiment. The DAG card 210,220 also includes an integrated circuit (IC) 304, a RAM buffer 302, a Peripheral Component Interconnect Express (PCIe) connector, and two communication ports 306A and 306B. The IC 304 is coupled to RAM buffer 302. The PCIe connector couples the DAG daughter-card to a PCIe socket on a motherboard 310 of an NGA.

In one embodiment, the IC 304 includes a field-programmable gate array (FPGA). Accordingly, via the FPGA, the DAG card 210,220 is programmable to be located at anywhere required in the data center computer network. In particular, the DAG card 210,220 is programmable to acquire data packets from the data center, calculate entropy for each data packet, time stamp each data packet, truncate certain data packets, and insert the entropy value into a header of the packet. The IC 304 can be programmed to perform the truncation and time stamping of the packets prior to storage.

In one embodiment, the communication ports 306A and 306B are bi-directional communication ports, each having an ingress capability and an egress capability. In one embodiment, the bi-directional ports can be Ethernet communication ports. In some embodiments, the communication ports of the DAG cards can be Fibre Channel communication ports compatible with the Fibre Channel protocol.

The DAG card 210 generally performs packet capture and processing operations (e.g., data acquisition and generation). More specifically, the DAG card 210,220 performs the truncation and time stamping of the packets disclosed herein to conserve memory locations and storage space in a storage device.

While certain exemplary embodiments have been described and shown in the accompanying drawings, it is to be understood that such embodiments are merely illustrative of and not restrictive, and that the embodiments not be limited to the specific constructions and arrangements shown and described, since various other modifications may occur to those ordinarily skilled in the art.

When implemented in software, the elements of the embodiments of the invention are essentially the code segments (instructions) to perform the necessary tasks. The program or code segments can be stored in a processor readable medium or transmitted by a computer data signal embodied in a carrier wave over a transmission medium or communication link. The processor readable medium may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The code segments can be downloaded via computer networks such as the Internet, Intranet, etc.

While this specification includes many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations, separately or in sub-combination. Moreover, although features may be described above as acting in certain combinations and even initially claimed as such, one or more features from a claimed combination can in some cases be excised from the combination, and the claimed combination can be directed to a sub-combination or variations of a sub-combination. Accordingly, the claimed invention is limited only by patented claims that follow below.

What is claimed is:

1. An apparatus comprising:
an input port to receive ingress computer data packets into a computer network from a wide area network and egress computer data packets out from the computer network to the wide area network;
a packet analyzer coupled to the input port to receive the ingress and egress computer data packets, the packet analyzer to identify header fields and a starting point of payload data in the ingress and egress computer data packets;
an entropy calculator circuit coupled to the packet analyzer to receive the starting point of the payload data, the entropy calculator circuit to examine each octet of the payload data to generate an entropy estimate of the ingress and egress computer data packets;
a comparator circuit coupled to the entropy calculator circuit to receive the entropy estimate of the ingress and egress computer data packets, the comparator circuit to compare the entropy estimate with a variable truncation threshold, wherein if the entropy estimate is greater than the variable truncation threshold, then the comparator circuit generates an entropy exceed signal that indicates the payload data could be truncated to conserve storage space; and
a processor coupled to the comparator circuit, the processor to compress at least some of the payload data that are not truncated.

2. The apparatus of claim 1, further comprising:
packet valuation logic coupled to the packet analyzer to receive the header fields of the ingress and egress computer data packets, the packet valuation logic to generate a truncation enable signal based on information in one or more of the header fields indicating a low storage value packet that can be truncated.

3. The apparatus of claim 2, wherein
the packet valuation logic to generate a truncation disable signal based on information in one or more of the header fields indicating a high storage value packet that is to be saved for incident or performance analysis.

4. The apparatus of claim 2, further comprising:
a logic gate coupled to the comparator circuit to receive the entropy exceed signal and the packet valuation logic to receive the truncation enable signal, the logic gate to logically AND the entropy exceed signal and the truncation enable signal together to generate a truncate signal indicating that all or a part of the payload data can be truncated to conserve storage space.

5. The apparatus of claim 4, further comprising:
a record truncator coupled to the logic gate to receive the truncate signal, the record truncator to insert the entropy estimate of the packet into the header field and truncate all or a portion of the payload data generating a truncated packet;
a memory device coupled to the record truncator to receive the truncated packet, the memory device having a plurality of memory cells to temporarily store the truncated packet.

6. The apparatus of claim 5, further comprising:
a storage device coupled to the memory device,
wherein the processor moves the truncated packet from the memory device into the storage device for longer term retention.

7. The apparatus of claim 2, wherein
the packet valuation logic generates the truncation enable signal further based on one or more of truncation rules.

8. The apparatus of claim 7, wherein
the truncation rules are user specified to customize policies to truncate payload data in computer data packets.

9. The apparatus of claim 1, further comprising:
a tap coupled to the port, the tap coupled in communication to and between client computers and computer servers to generate a copy of the ingress and egress computer data packets for the port.

10. The apparatus of claim 1, wherein
the starting point of the payload data in the ingress and egress computer data packets is a payload offset value.

11. A computer-implemented method of conserving storage space in a network recorder, the method comprising:

receiving a computer data packet including a header and payload data;

estimating an entropy estimate of the payload data in the computer data packet;

determining the computer data packet has storage value or not based on the header of the computer data packet, wherein the determining includes comparing the entropy estimate with a variable truncation threshold;

determining the computer data packet has no storage value based on the entropy estimate being greater than the variable truncation threshold;

compressing at least some of the payload data associated with the computer data packet that has storage value; and storing all or a portion of the computer data packet into a storage device based on the estimated entropy and the storage value.

12. The computer-implemented method of claim 11, wherein it is determined that the computer data packet has little storage value and the method further comprises:

prior to the storing of all or a portion of the computer data packet,
truncating all or portion of the payload data in the computer data packet with little storage value based on the estimated entropy being greater than the variable truncation threshold.

13. The computer-implemented method of claim 11, wherein
the header indicates the payload data is encrypted.

14. The computer-implemented method of claim 11, wherein
the estimated entropy indicates the payload data is compressed.

15. The computer-implemented method of claim 11, wherein it is determined that the computer data packet has great storage value and the method further comprises:

prior to the storing of all or a portion of the computer data packet,
compressing the payload data in the computer data packet based on the estimated entropy being less than the variable truncation threshold, wherein the variable truncation threshold is a user variable.

16. The computer-implemented method of claim 15, wherein
the estimated entropy indicates the payload data is uncompressed text.

17. The computer-implemented method of claim 11, wherein
the determining the computer data packet has storage value or not is further based on one or more truncation rules.

18. The computer-implemented method of claim 17, wherein
the truncation rules are user specified to customize policies to truncate payload data in the computer data packet.

19. A network recorder in a computer network, the network recorder comprising:

a storage device,
a motherboard in communication with the storage device,
a plurality of daughter-cards coupled to the motherboard, each daughter-card including
an input port to receive ingress computer data packets into the computer network from a wide area network and egress computer data packets out from the computer network to the wide area network;
a packet analyzer coupled to the input port to receive the ingress and egress computer data packets, the packet analyzer to identify header fields and a starting point of payload data in the ingress and egress computer data packets;
an entropy calculator circuit coupled to the packet analyzer to receive the starting point of the payload data, the entropy calculator circuit to examine each octet of the payload data to generate an entropy estimate of the ingress and egress computer data packets;
a comparator circuit coupled to the entropy calculator circuit to receive the entropy estimate of the ingress and egress computer data packets, the comparator circuit to compare the entropy estimate with a variable truncation threshold, wherein if the entropy estimate is greater than the variable truncation threshold, then the comparator circuit generates an entropy exceed signal that indicates the payload data can be truncated to conserve storage space; and
a processor coupled to the comparator circuit, the processor to compress at least some of the payload data that are not truncated.

20. The network recorder of claim 19, wherein
the processor receives the entropy exceed signal, truncates the payload data, and stores the truncated packet into the storage device.

21. The network recorder of claim 19, wherein
the entropy estimate does not exceed the variable truncation threshold for a given packet and the storage value of the packet is high, and
the processor compresses the packet with a compression algorithm and stores the compressed packet into the storage device.

22. The network recorder of claim 19, wherein
the entropy estimate does not exceed the variable truncation threshold for a given packet and the storage value of the packet is low, and
the processor discards the packet.

* * * * *